(12) United States Patent
Siepmann

(10) Patent No.: US 6,921,911 B2
(45) Date of Patent: Jul. 26, 2005

(54) METHOD AND DEVICE FOR OPTICALLY DETERMINING A FILLING LEVEL IN LIQUID-FILLED CONTAINERS

(75) Inventor: Georg Siepmann, Ratingen (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 10/369,084

(22) Filed: Feb. 18, 2003

(65) Prior Publication Data

US 2003/0155538 A1 Aug. 21, 2003

(30) Foreign Application Priority Data

Feb. 18, 2002 (DE) .......................... 102 06 824

(51) Int. Cl.⁷ .............................................. G01N 15/06
(52) U.S. Cl. ........................ 250/577; 250/904; 73/293
(58) Field of Search ................................. 250/573, 576, 250/577, 227.25, 900–908; 73/1.73, 1.3, 447, 53.07, 290 R, 291, 293, 1.31, 53.04; 116/227; 340/618, 619; 356/133

(56) References Cited

U.S. PATENT DOCUMENTS

| | | | | |
|---|---|---|---|---|
| 3,120,125 A | | 2/1964 | Vasel ........................... | 73/293 |
| 3,424,004 A | | 1/1969 | Repata ......................... | 73/327 |
| 3,648,521 A | | 3/1972 | Amendolia ................... | 73/293 |
| 4,247,784 A | | 1/1981 | Henry ........................ | 250/577 |
| 4,256,403 A | * | 3/1981 | Powell ........................ | 356/73 |
| 4,809,551 A | * | 3/1989 | Grossiord | |
| 4,873,863 A | | 10/1989 | Bruhl et al. .................. | 73/49.2 |
| 4,979,797 A | | 12/1990 | Nemeth .................... | 350/96.29 |
| 5,159,834 A | * | 11/1992 | Eisele | |
| 5,534,708 A | * | 7/1996 | Ellinger et al. ............. | 250/577 |
| 6,172,377 B1 | * | 1/2001 | Weiss | |
| 6,173,609 B1 | * | 1/2001 | Modlin | |
| 6,429,447 B1 | * | 8/2002 | Nowak | |

FOREIGN PATENT DOCUMENTS

| | | | | |
|---|---|---|---|---|
| DE | 1773260 | | 2/1972 | ........... G01F/23/28 |
| DE | 31 28 925 | | 2/1983 | ........... G01F/23/04 |
| DE | 32 43 839 | | 5/1984 | ........... G01F/23/04 |
| DE | 3606847 | | 9/1987 | ........... G01F/23/04 |
| EP | 0006317 A1 | * | 1/1980 | |
| GB | 1 603 389 | | 11/1981 | ........... G01F/23/02 |
| JP | 2001183219 | | 6/2001 | ........... G01B/23/28 |

* cited by examiner

Primary Examiner—Thanh X. Luu
(74) Attorney, Agent, or Firm—Grossman Tucker Perreault & Pfleger, PLLC (57) ABSTRACT

In a method of optically determining a level of liquid in a liquid-filled container a light guide body projects into the container. The light guide body has an end face for the entry and exit of light and stepped side faces forming separate reflection faces. The light is totally reflected at those reflection faces which are not immersed in the liquid but refracted into the liquid at immersed reflection faces. The totally reflected light is reflected back to the end face. The intensity of the light beam reflected totally by each reflection face back to the end face is measured separately. Measurement signals for determining the filling level are subjected to plausibility checking to recognise and eliminate measurement faults and errors. The invention can be used for determining the level of liquid in a container or tank for fuel, washing water, oil, hydraulic fluid and the like in a motor vehicle.

34 Claims, 5 Drawing Sheets

Fig. 3 a) Plausible? ○ OK, ○ OK, ○ OK b) Plausible? ○ OK, ○ OK, ● OK c) Plausible? ○ OK, ● Correction, ○ OK d) Plausible? ○ OK, ● OK, ● OK e) Plausible? ● Correction, ○ OK, ● OK f) Plausible? ● OK, ● OK, ● OK g) Plausible? ● Correction, ○ OK, ○ OK

Fig. 4

METHOD AND DEVICE FOR OPTICALLY DETERMINING A FILLING LEVEL IN LIQUID-FILLED CONTAINERS

FIELD OF THE INVENTION

The invention concerns a method and an device for optically determining a filling level in a liquid-filled container, for example a fuel tank of a motor vehicle.

BACKGROUND OF THE INVENTION

Devices for optically determining a filling level have the advantage over mechanical and electrical devices which are wide-spread in use that they do not have any moving components and they are therefore not susceptible to wear and mechanical failure.

In this respect reference may be made to U.S. Pat. No. 3,424,004 disclosing a device for optically determining a filling level, including a light guide body which projects from above into the tank for containing a liquid and which has reflection faces arranged in respective pairs at different heights along the longitudinal extent of the vertically extending light guide body. The reflection faces are displaced relative to each other horizontally and can be observed through the upward end face of the light guide body. The reflection faces reflect light only when they are not immersed in the liquid in the tank. The level of liquid is then between the reflection faces which respectively appear light and dark.

Consideration may also be given to DE-A1-31 28 925 disclosing a level sensor for liquids, comprising a light guide body which dips into the liquid in a container and which is of a rectangular cross-section. The light guide body is of a stepped configuration at both narrow sides, the shoulders of the steps being formed by first and second reflection faces. Arranged in the upper end face of the light guide body are a light source and a light receiver. The light which is emitted downwardly from the light source into the light guide body is reflected at the first reflection faces which are not immersed in the liquid, totally in the direction of the second reflection faces and from those to the light receiver at the upward end of the light guide body. The signal outputted by the light receiver is greater or smaller, depending on the respective number of reflection faces which are operative to reflect the light, that is to say depending on the respective filling level, and that signal can thus serve to indicate the filling level.

Such a device can distinguish between discrete filling level heights, with the number of different filling levels that can be ascertained being predetermined by the number of first and second reflection faces respectively. In order to permit virtually continuous display of the filling level, it is possible to provide a large number of steps with first and second reflection faces respectively. In that case however the reflection faces become relatively small and as a result there is the danger of drops of liquid remaining clinging thereto when the level of the liquid in the container falls. That impedes total reflection and simulates a filling level which is higher than the actual level of liquid in the container.

Reference may also be made to DE-A1-32 43 839, more especially FIG. 8 thereof, disclosing a device in which a plurality of light guide bodies each having a respective reflection face are disposed at different heights in the side wall of a liquid container, the photosensors thereof being connected in succession. That arrangement is complicated and susceptible to trouble as leaks can occur at the locations where components are passed through the side wall of the structure.

DE-C-100 35 263 also discloses a device for optically determining the level of a liquid in a container, comprising a light guide body which in use projects into the container and which has an end face with an entry region for the light and an exit region for the light, together With a stepped configuration in respect of a side face, to afford reflection faces for selective reflection of light, depending on whether a reflection face is or is not immersed in the liquid. In that arrangement, provided in the light guide body between the narrow sides are gaps so that light which is reflected from a reflection face on to a second reflection face in opposite relationship therewith can only pass through ribs formed between the gaps. The production of such a light guide body is difficult however if it is to have a large number of reflection faces to provide a virtually continuous display of the filling level of liquid in the container.

SUMMARY OF THE INVENTION

An object of the present invention is to provide a method of optically determining a filling level of liquid in a liquid-filled container, which can be carried out in a simple fashion while affording accurate results.

Another object of the invention is to provide a method of determining the level of a liquid in a container, which affords positive and reliable results without entailing a seriously complicated apparatus structure.

Still another object of the invention is to provide a device for determining a level of liquid in a container which is of a simple structure and inexpensive to manufacture while affording a low level of susceptibility to faults and malfunctions.

In accordance with the principles of the present invention the foregoing and other objects are attained in the method aspect by a method of determining a filling level in a liquid-filled container using a light guide body of rectangular, square, round or elliptical cross-section, which in use projects into the volume of the container. The light guide body has an end face for the entry and exit of light and at side faces thereof reflection faces which are separated by a stepped configuration. The light is totally reflected at those reflection faces which do not dip into the liquid but is refracted into the liquid at the reflection faces which dip therein. The light totally reflected by a reflection face is reflected back to the end face. The intensity of the light beam reflected by each reflection face totally and back to the end face of the light guide body is measured separately.

As will be seen from the description hereinafter of preferred embodiments of the method of the invention, separate measurement of the intensity of the light reflected by each reflection face towards the end face of the light guide body is preferably implemented by means of at least one photosensor for each reflection face. That procedure therefore affords at least one measurement signal for each of those reflection faces. The measurement signal is either of a low value if the reflection face dips into the liquid ('full' in respect of that reflection face) or a high value if the liquid is not covering the reflection face ('empty').

The measurement signals, optionally after suitable amplification, can be passed to a display device for providing a user of the container with a display of the filling level thereof. That can be effected for example in the form of a row of light emitting diodes which are respectively activated by a high measurement signal, that is to say when the corresponding reflection face signals that it is not covered by the liquid in the container. From the number of light emitting diodes which have lit up, the user can then see how far the container has been emptied. In that respect he can recognise and disregard an incorrect 'full' message in the empty region of the container.

In a preferred feature however the measurement signals are suitably evaluated and checked prior to display. The evaluation procedure can entail for example corrections in terms of light attenuation in the light guide body, scatter light components and noise, constituted for example by a dark signal. The checking operation can involve plausibility checking in which false 'full' signals between adjacent 'empty' signals which are caused by virtue of droplets of liquid clinging to a reflection face in the empty region of the container are recognised and replaced for example by the signals from the adjacent reflection faces or suitably corrected by interpolation.

The objects of the invention are further achieved in a first device aspect thereof by a device for determining a filling level in a liquid-filled container, including a light guide body which is adapted in operation to project into the internal volume of the container, the light guide body being of rectangular cross-section and having an end face with an entry region for the entry of light into the light guide body and an exit region for the exit of light from the light guide body and first and second side faces each comprising step portions providing at least two first reflection faces, the reflection faces at the first side face being associated with respective reflection faces at the second side face. The reflection faces at the first side face are at least in part such that light is refracted into the liquid when the reflection face in question is immersed in the liquid but totally reflected back into the light body in a direction towards the second side face thereof when the reflection face in question is not immersed in the liquid, a reflection face at the second side face reflecting the light totally reflected by the first reflection face in a direction towards the exit region of said end face, and measuring means for separately measuring the intensity of the light beam totally reflected by each said second reflection face.

In a further device aspect the objects of the invention are attained by a device for determining a filling level in a liquid-filled container, including a light guide body which is adapted in operation to project into the internal volume of the container, having an end face with an entry region for the entry of light into the light guide body and an exit region for the exit of light from the light guide body and side faces comprising step portions providing at least two substantially annular reflection faces, wherein said reflection faces are so designed at least over a portion of their periphery that the light is refracted into the liquid when the reflection face in question is immersed in the liquid but is totally reflected back into the light body in a direction on to the oppositely disposed regions of the reflection faces and is totally reflected from there further to aid end face when the reflection face is not immersed in the liquid, wherein associated with each first reflection face is a second reflection face at stepped portions of the second side face, said second reflection face reflecting the light totally reflected by the first reflection face in a direction towards the exit region of said end face, and measurement means for separately measuring the intensity of the light beam totally reflected by each said second reflection face.

As will also be seen from preferred embodiments of the device as described hereinafter the device has measuring means for measuring the light reflected by the reflection faces to the end face of the light guide body, with which measuring means the intensity reflected by each individual reflection face can be measured separately.

In a preferred feature the measuring means are optically connected to the light-exit region of the light guide body. That is preferably effected by the measuring means being mounted on the exit region, more specifically in such a way that there is at least one measuring means for each light beam which is reflected by a reflection face and issues from the light guide body. In order to avoid unwanted light losses due to refraction at the boundary surfaces the measuring means can also be let into recesses in the exit region and/or optically connected to the light guide body by way of a light-transmissive cement with a refractive index suited to the light guide body.

Another advantageous configuration of the device according to the invention provides that the measuring means are connected to the exit region by way of a light guide cable. The cable must have at least one separate optical fiber for each of the light beams reflected by the reflection faces to the end face of the light guide member, the optical fibers each being optically connected to a respective measuring means. That makes it possible for the measuring means to be disposed at a remote location from the light guide body.

In a preferred feature reflection faces form an angle of at least approximately 45°, with the direction of an incident light beam. That causes the light to be reflected through 90° in each case so that after the second reflection it then extends in parallel relationship in the opposite direction to the incident light. In that case total reflection occurs at the interface in relation to air if the refractive index of the light guide body is greater than about 1.41, which is the case practically for all materials that fall to be considered here.

It will be appreciated that the material of the light guide body must also be resistant in relation to the liquid, the level of which is to be measured. Polyether sulfones and polyether imides have proven to be suitable for use in fuel tanks of vehicles.

In regard to production of the light guide body, care is to be taken to ensure that the reflection faces enjoy adequate surface quality to limit light scatter. A suitable production procedure in that respect is injection molding. Light guide bodies of a circular cross-section can also be produced by mechanical machining.

Each reflection face of the light guide body corresponds to a given filling height of liquid in the container. If the latter is of a cross-section which is constant in height, the filling level is displayed in equal steps in respect of volume if the stepped configurations with the reflection faces of the light guide body are at equal spacings in respect of height. In the case of irregularly shaped containers the spacings in respect of height of the reflection faces can be altered in such a way that they correspond to equal steps in respect of volume. On the other hand however it is also possible to take account of different steps in respect of volume, with equally spaced reflection faces, by means of a calibration table or calibration curve which is contained, for example stored, in the evaluation unit.

The light source used for producing the light to be introduced into the light guide body can be for example a light emitting diode. Depending on the size of the end face of the light guide body it is possible to use for example commercially available light emitting diodes measuring for example 3, 5 or 8 mm in diameter. It is also possible to use light emitting diodes with a rectangular or square irradiation characteristic.

Preferably the measuring means used may be photosensors such as photoresistors or photodiodes. In that case there must be at least one photosensor for each of the reflection faces. If there are two or more photosensors it is possible to implement more precise measurement by virtue of averaging of the measurement signals or by eliminating wild results due to defective sensors.

In another preferred feature of the invention the photosensors are in the form of a prefabricated linear array. Such arrays with photodiodes are commercially available in the form of line sensors. It will be noted here that the term photodiode may be used hereinafter generically as typically denoting all other kinds of photosensors which can be used in the context of the present invention, such as for example photoresistors.

In this respect the invention is to be interpreted as providing that a single photosensor or photodiode can be operatively associated with each individual light beam from one or more light sources. They can be obtained with different numbers of pixels so that it is possible to select a line sensor which includes at least one photodiode for each second reflection face of the light guide body. They may include suitable switches or shift registers so that the measurement signals of the individual photodiodes are outputted by way of a serial output, which facilitates onward transmission to an evaluation device. Suitable assemblies are for example line sensors with 64 or 128 photodiodes (pixels).

The device according to the invention preferably also includes an evaluation means for evaluating and checking the signals from the photodiodes. The evaluation procedure includes for example deciding, in respect of each measurement signal provided by a photodiode, whether the reflection face corresponding to that photodiode is immersed in the liquid (the condition referred to as 'full' in relation thereto) or is not immersed in the liquid (the condition referred to as 'empty'). In this respect it is possible to take account of specific corrections, for each reflection face, in respect of noise, scatter light and light attenuation, which corrections can be ascertained by calibration measurements and can be stored in a suitable library.

The evaluation unit may also implement a plausibility check as described above. The arrangement will advantageously include a microcontroller for control and implementation of all evaluation and checking functions such as reading in the measurement signals, evaluation, plausibility checking, conversion of signals into filling levels and for the output to a display unit.

The invention can be used for determining the filling level in a liquid-filled container generally. The containers may be for example containers or tanks for fuel, washing water, oil, hydraulic fluid and other liquids in motor vehicles.

Further objects, features and advantages of the invention will be apparent from the description of preferred embodiments set forth by way of example hereinafter.

DESCRIPTION OF PREFERRED EMBODIMENTS

Figure 1:
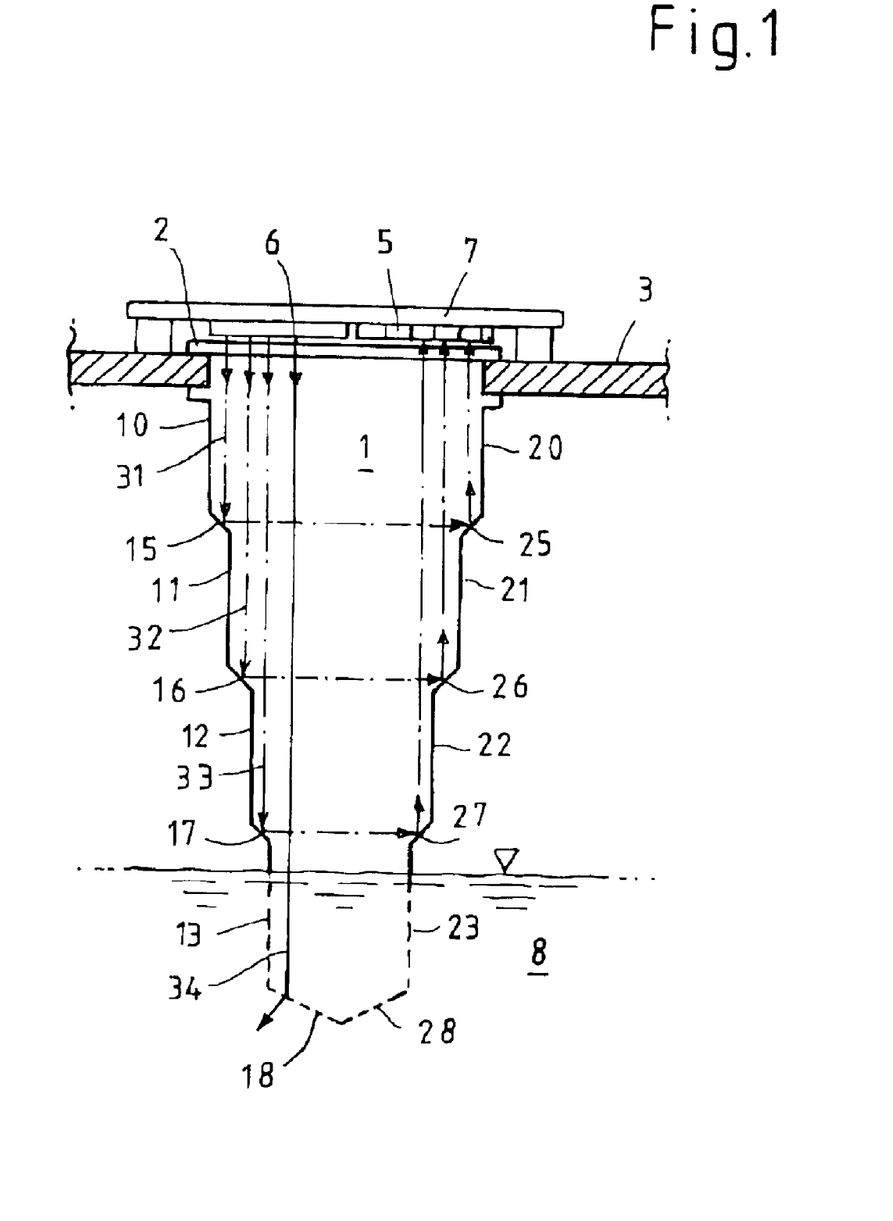
FIG. 1 is a view in longitudinal section of a light guide body and the structure therearound.

Referring firstly to FIG. 1, shown therein is a diagrammatic view of a device according to the invention for optically determining the level of a liquid in a liquid-containing container, comprising a light guide body 1 which in this embodiment is of rectangular cross-section. The body 1 has an end face 2, a first narrow side face 10 and a second narrow side face 20. The body 1 is fitted into the container wall 3 in such a way that the end face 2 extends parallel to the outside surface of the wall 3 or the level of liquid, when the liquid is in a rest condition.

The end face 2 provides a light entry region over which is disposed a light source 6, and a light exit region, over which is disposed a photosensor in the form of a line sensor 5. The light source 6 and the line sensor 5 are mounted on the underside of a circuit board 7 which is fixed on the wall 3 and which carries the electronics for control and evaluation functions. The circuit board 6 also prevents interference light from impinging from the exterior on the end face 2 of the body 1.

The side faces 10 and 20 of the body 1 have stepped portions 11, 12, 13, 21, 22 and 23 which are connected by reflection faces 15, 16, 17, 25, 26, 27. Further reflection faces 18, 28 are to be found at the lower end of the body 1. The reflection faces form an angle of 45° with the side faces 10 and 20.

A photodiode on the line sensor 5 is associated with each second reflection face 25, 26, 27, 28. In order to simplify the view in FIG. 1, the drawing here only shows three stepped portions 11, 21; 12, 22; 13, 23 and eight reflection faces 15, 25; 16, 26; 17, 27; 18, 28. In practice however there are advantageously a substantially larger number of stepped portions and reflection faces, depending on the desired degree of resolution, for example about 70.

The light source 6 is so directed that it emits substantially collimated light in parallel relationship with the side face 10. In the illustrated example only the first reflection face 18 is immersed in the liquid 8 while the other reflection faces 15, 16, 17 are in air. Therefore the light beams 31, 32, 33 impinging thereon experience total reflection, more specifically through 90°, as they impinge thereon at an angle of 45°. They impinge on the corresponding second reflection faces 25, 26, 27 and are again totally reflected through 90°, that is to say towards the line sensor 5 at the exit region of the end face 2. As a consequence of the stepped configuration of the second side face 20 each light beam is incident on a respective photodiode of the line sensor 50, which is associated with the corresponding reflection face. Those photodiodes deliver a high measurement signal which is recognised by an evaluation unit, to be described hereinafter, as 'empty'. On the other hand the light beam 34 incident on the immersed reflection face 18 is not reflected but is refracted into the liquid and is not incident on the corresponding photodiode. The signal thereof is low and is recognised as constituting 'full'.

Figure 2:
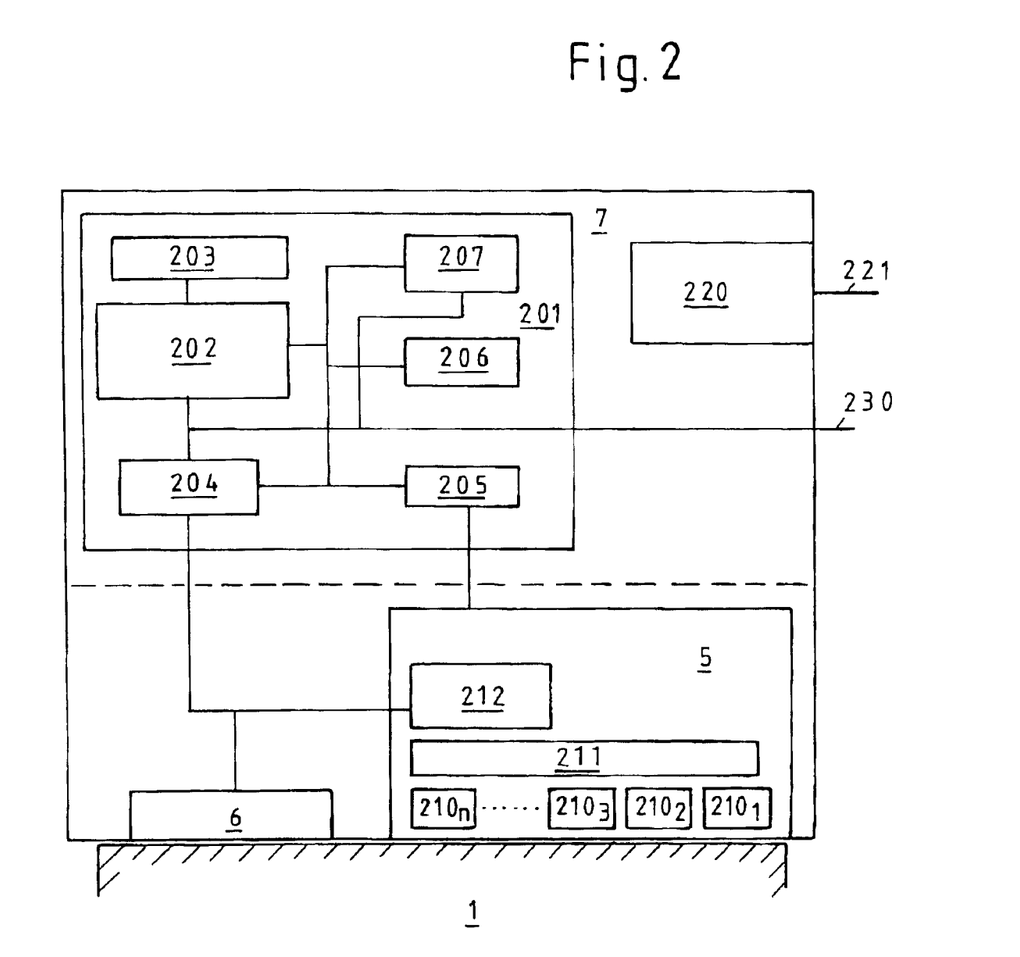
FIG. 2 shows a block circuit diagram of a measuring and evaluation device of the arrangement according to the invention.

Referring now to FIG. 2, shown therein by way of example are the functions of a microcontroller 201 which here for example is mounted on the circuit board 7, as well as the light source 6 and the line sensor 5. The light source 6 and the line sensor 5 are mounted to the circuit board 7 at the underside thereof and directly adjoin the light guide body 1. The line sensor 5 includes a plurality n of photodiodes for a plurality n of pixels 210.1 through 210.n. In this case the number n does not need to be equal to the number of reflection faces provided on the light guide body 1, but it may also be larger than the number thereof. At least one pixel of the line sensor should be associated however with each reflection face.

For the purposes of timed control of the procedure involved in filling level measurement the microcontroller 201 includes a clock generator 203 which supplies signals to the CPU 202. The CPU 202, by way of an I/O driver 204, actuates the light source 6 and the line sensor 5.

Integrated in the line sensor 5 is a switching logic 211 and an X-bit shift register 212 which provide for serial output of the signals coming from the individual photodiodes, to the A/D converter. The digitised signals are then put into intermediate storage with the associated addresses of the photodiodes in the RAM 206 and are available for plausibility checking. In the ROM/EPROM 207 are stored inter alia the data for the checking procedure and for conversion of the signals into a filling level signal, which data can be called up by the CPU 202. Those data can be ascertained for example by way of a calibration test.

The light attenuation effect in the light guide body 1 can also be taken into account in terms of the filling level measurement procedure controlled by the microcontroller 201. Admittedly, in the case of a new light guide body that is very slight, but it can increase over the operating life of the device of at least 15 years, due to the effect of the liquid in respect of which the level is to be measured. Correction for the light attenuation effect can be implemented for example by conversion factors, which are dependent on the light path involved, for the signals, or also by suitable alteration to the switch-on time of the light source or emission therefrom. That alteration can be effected in block-wise manner for groups of reflection faces which are disposed one above the other, or photodiodes which correspond thereto and which are disposed in mutually juxtaposed relationship. The correction data can be stored in the EPROM 207 and can be ascertained from time to time by calibration tests or established on the basis of empirical values and inputted upon maintenance by way of the data system of the vehicle in which the container is employed.

It will be appreciated that short-term fluctuations in the measurement signals which may be caused by movement of the surface of the liquid in the container such as a tank, for example as a result of the vehicle in which the tank is fitted negotiating a curve or travelling up or down a gradient, can be compensated by computation procedures in the evaluation operation. That can replace the function of a damping pot or it can supplement same if such a damping configuration is provided.

The signal corresponding to the respective filling level of liquid in the container is passed to a digital or analog display as indicated at 230. The current source as indicated at 221 in FIG. 2 is afforded by the on-board voltage of the vehicle, which is stabilised by way of a voltage regulator 220 and fed by way of suitable lines which are not shown here to the microprocessor 201 and the line sensor 5.

Figure 3:
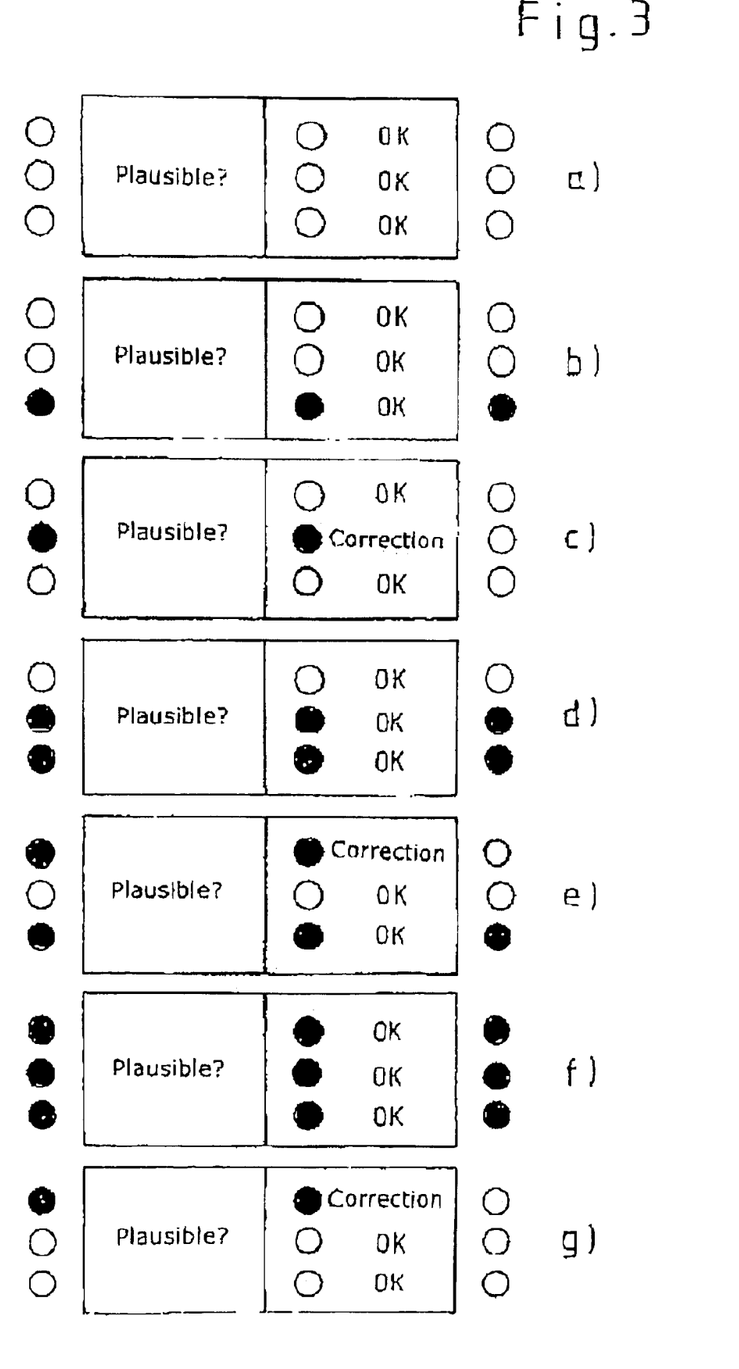
FIG. 3 shows various cases in plausibility checking.

Consideration will now be given to FIG. 3 showing by way of example various cases of plausibility checking for a system having three photodiodes which correspond to reflection faces at three different heights. In FIG. 3 solid circles denote that the condition of 'full' was detected in respect of the corresponding reflection face while empty circles denote 'empty'. The left-hand column in FIG. 3 denotes the conditions signalled by the evaluation unit while the right-hand column shows the conditions to be outputted after the checking procedure has been run. The criterion for the checking procedure is that no reflection face disposed below a reflection face which is signalling 'full' can signal 'empty'. That is at least not probable. In the case indicated by a) in FIG. 3 all three reflection faces are signalling 'empty'. That appears plausible for all three and is also displayed in that way. In the case b) only the lower reflection face is signalling 'full', and this is also possible for all three reflection faces. Case c) shows 'full' for the middle reflection face but 'empty' for the upper and lower reflection faces. That display is not plausible for the central and lower faces. The checking device decides whether probably the central face is incorrectly showing 'full' by virtue of the presence of a drop of liquid thereon and corrects it to 'empty'. In case d) the checking procedure does not effect any change. Case e) shows 'empty' for the central face but 'full' for the others. This could involve both an error due to a drop of liquid on the upper reflection face and also an error due to bubbles at both central reflection faces, but the latter situation is highly improbable. The checking procedure therefore recognises an error at the upper reflection face and that face is thus corrected to 'empty'. Finally case f) is again plausible as all three faces agree in signalling 'full'. In case g) the upper signal 'full' is not plausible because of the signals 'empty' which are displayed in the reflection faces therebeneath. The upper signal is therefore corrected to 'empty'.

Figure 4:
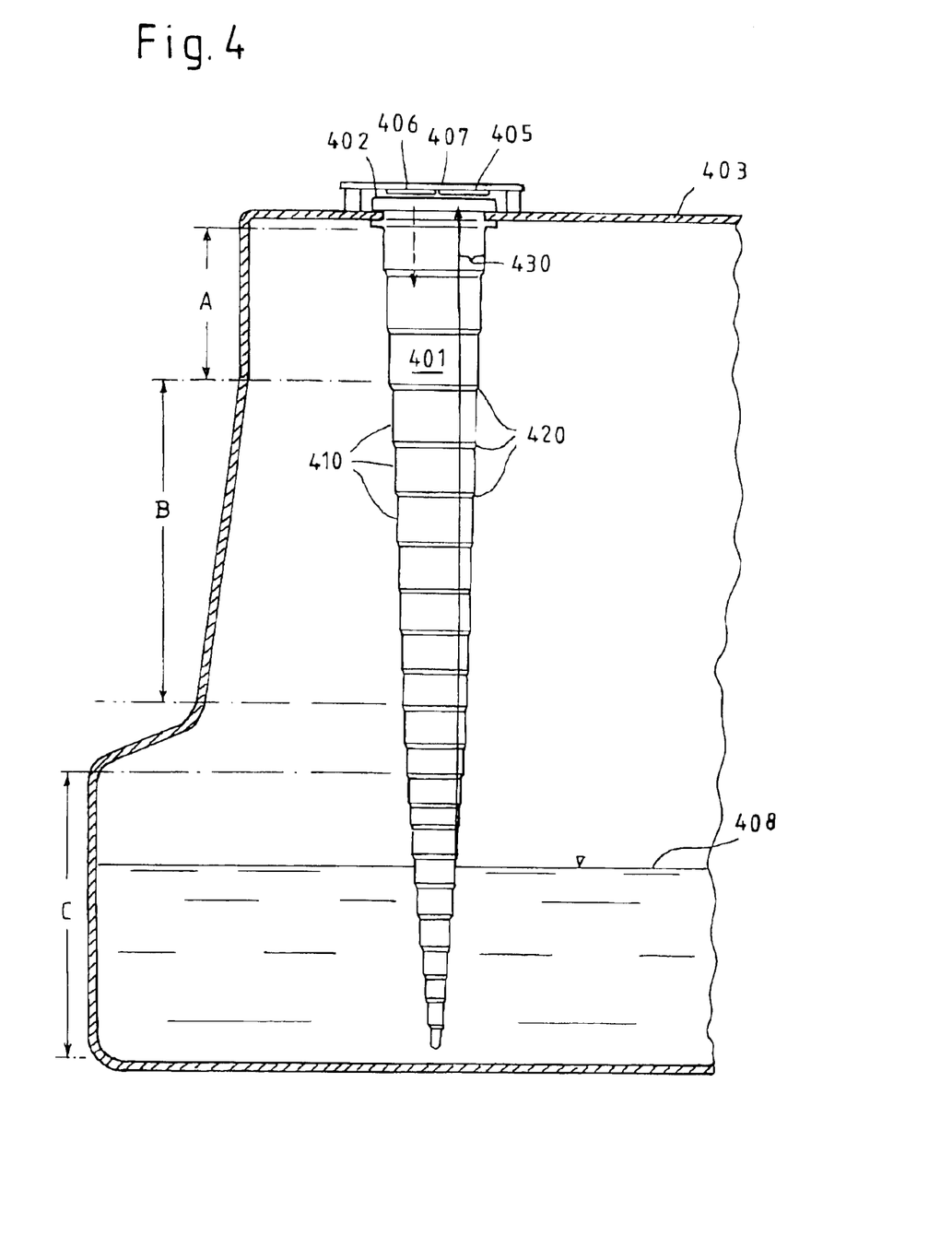
FIG. 4 is a diagrammatic view in section of a practical embodiment of a device according to the invention.

Reference will now be made to FIG. 4 showing an example of a practical configuration of the device according to the invention. The light guide body 401 is of a circular cross-section, it is fitted perpendicularly into a fuel tank 403 of a vehicle and at its side faces it has 22 step portions 401, between which are disposed reflection faces 420 which are inclined at an angle of 45° relative to the longitudinal axis of the vertically extending elongate light guide body 401. The heights of the stepped portions are so selected that a step corresponds to the same respective increment in respect of volume of the tank. In the region indicated at A in FIG. 4 the tank is of the smallest cross-sectional area and therefore a relatively large step, that is to say of relatively large dimension in the vertical direction of the light guide body 401, corresponds to an increment in respect of volume of for example 2 liters. In contrast in the region C the cross-section of the tank is relatively large so that the same increment in respect of volume corresponds to a smaller step. In the region B the cross-section decreases with increasing height from the bottom of the tank so that the steps become progressively larger in an upward direction.

Arranged above the end face 402 of the light guide body 401 is a circuit board 407 carrying a light diode 406 and a line sensor 405. The light which is irradiated into the light guide body 401 by the light emitting diode 406 but which is not shown in FIG. 4 is now reflected or refracted into the liquid, by the reflection faces 420 respectively, in such a way that a light beam 430 impinges on the line sensor 405. The width of the light beam 430 corresponds here to the level of the fuel 408 in the tank. When the tank is full no light is reflected on to the line sensor 405 while when the tank is empty the light beam is of the maximum width. The width of the light beam therefore changes proportionally with respect to the amount of fuel which is absent in relation to maximum filling of the tank, depending on the respective filling level of the tank. The light beam 430 impinges on the light sensor 405 and the measurement signals thereof, which originate from the individual photodiodes thereof, are successively read out and subjected to a plausibility checking procedure as discussed above. In that case the boundary or limit between the highest reflection face immersed in the liquid and the lowest reflection face which is not immersed in the liquid is detected as described above and displayed as the filling level in the tank, after suitable conversion, for example as liters.

It was found with tests with this embodiment that the 'empty' signal of a photodiode of the line sensor was approximately fourteen times as great as the 'full' signal. This shows that the proportion of scatter light, residual reflection at immersed reflection faces and noise is low.

Figure 5:
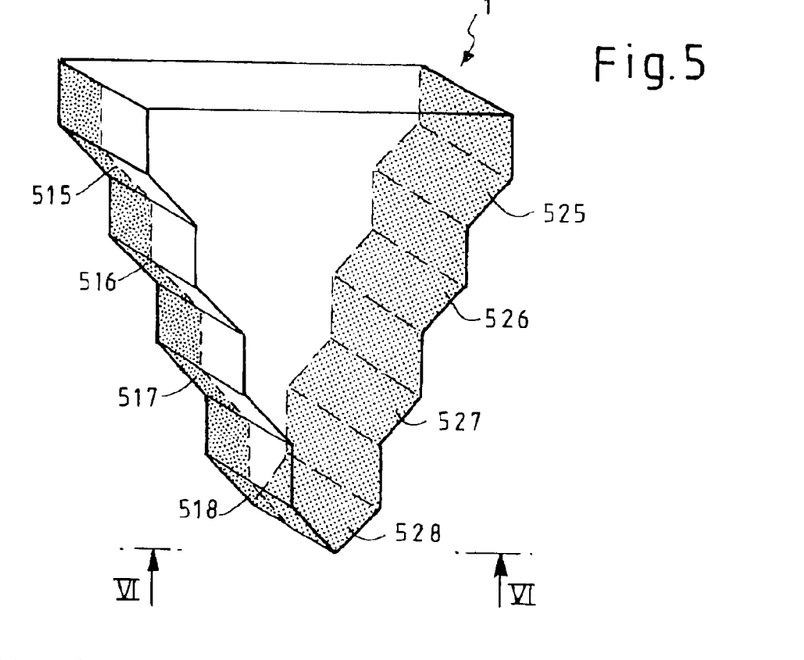
FIG. 5 is a perspective view of a further embodiment of a light guide body of the device according to the invention.

With reference now to FIG. 5, the operational reliability of the light guide body 1 can be further improved if some of the reflection faces, for example as indicated at 525, 526, 527, 528 in the case of a light guide body 1 of rectangular cross-section, as shown here, are of a permanently reflective nature, for example being of a mirrored nature. In that case the susceptibility to trouble due to the formation of drops on reflection faces is reduced as on each reflection step configuration of the light guide body 1 there is only one reflection face as indicated at 515, 516, 517, 518 that can be contaminated or polluted. In addition that arrangement provides that more light is reflected to the line sensor 5 in a situation involving total reflection dependent on the filling level, being therefore the empty condition of the container.

In order now to obviate possible ageing phenomena in respect of the material such as a suitable plastic material which is used for the light guide body it is desirable if at least some of the first reflection faces 515, 516, 517, 518 in FIG. 5 are at least additionally partially mirrored so that it is possible to produce on each reflection stepped configuration a reference signal which is uninfluenced by the level of liquid such as fuel in the container and by means of which it is possible to produce information, which can be taken into consideration in the signal evaluation procedure, relating to the light conductivity of the light guide body 1. As generally only the reflection faces 518, 528 which are arranged at the lowest position can be virtually always immersed in the liquid such as a fuel in the container, it would be possible for example to produce a reference signal in each case only for the uppermost and lowermost reflection steps and to compare those signals to each other.

Figures 6, 7:
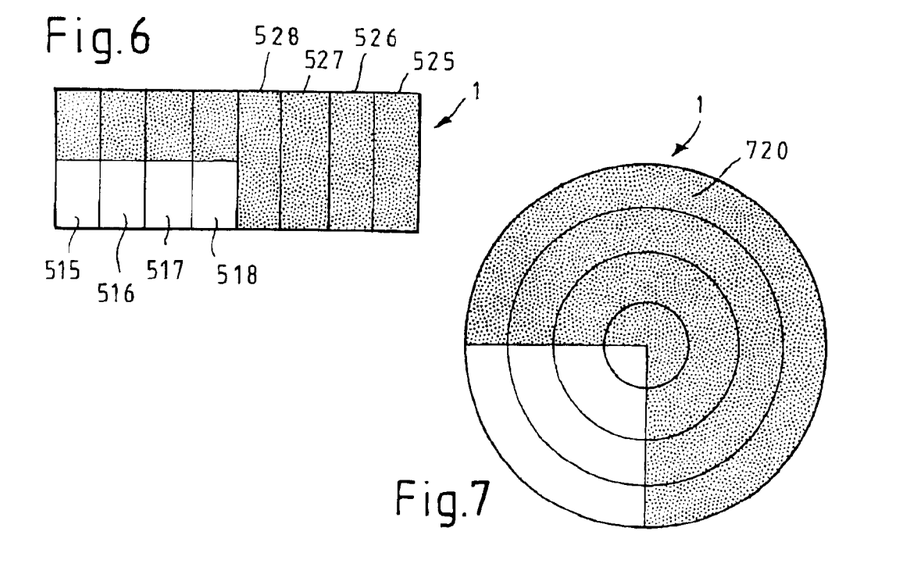
FIG. 6 is a view from below of the light guide body shown in FIG. 5.
FIG. 7 is a view from below of a light guide body which is of round cross-section and which is designed on the basis of the principle illustrated in FIGS. 5 and 6.

Reference is now made to FIG. 7 showing a view from below of a light guide body 1 which is a round cross-section and the reflection faces 720 of which are completely mirrored over a peripheral angle of 270°, thus leaving a region 271 which is not mirrored, in the form of a pie wedge. It will be appreciated that the light guide body 1 of the embodiment shown in FIG. 7 can also have a plurality of mirrored regions which are of a generally wedge-shape. The above-indicated angular division is also not necessarily required.

It will be appreciated that the above-described embodiments of the method and device according to the invention have been set forth solely by way of example and illustration therein and that various modifications and alterations may be made thereon without thereby departing from the spirit and scope of the invention.

What is claimed is:

1. A method of determining a filling level in a liquid-filled container using a light guide body which projects into the volume of the container and which has an end face for the entry and exit of light and side faces providing reflection faces separated by steps, wherein light introduced into the light guide body at said end face is totally reflected at those reflection faces which are not immersed in liquid in the container but is refracted into the liquid at immersed reflection faces, wherein light totally reflected by a reflection face is reflected back to the end face as a light beam, and wherein at least one measurement signal of the intensity of the light beam totally reflected is provided for each step and separately detected as a separate measurement of the intensity of the light reflected by each step relative to other steps, said at least one measurement signal being evaluated and checked, said evaluation and checking including plausibility checking for recognizing and eliminating measurement errors.

2. A method as set forth in claim 1 wherein the at least one measurement signal for each light beam reflected totally by a reflection face and back to the end face is effected by means of at least one photosensor.

3. A method as set forth in claim 2 wherein the measurement signals of the totally reflected light are passed to a display unit to display the filling level of liquid in the container.

4. A method as set forth in claim 1 wherein the evaluation operation includes correction in respect of at least one of the effects consisting of light attenuation in the light guide body, noise and scatter light.

5. A method as set forth in claim 1 wherein at least one reference signal is produced and evaluated, and the reference signal is reflected completely independently of the filling level of liquid in the container.

6. A method as set forth in claim 5 wherein a respective reference signal which is independent of said filling level is produced for a longest and a shortest signal path through the light guide body and evaluated.

7. A method as set forth in claim 1 wherein for each reflection face a reference signal reflected independently of said filling level is produced and evaluated.

8. A method as set forth in claim 1 wherein the light guide body is of rectangular cross-section.

9. A method as set forth in claim 1 wherein the light guide body is of square cross-section.

10. The method of claim 1, wherein said plausibility checking comprises evaluating the measurement signal from a reflection face and identifying whether or not said reflection face is signaling full under conditions where a lower reflection face is signaling empty.

11. Device for determining a filling level in a liquid-filled container, including a light guide body which is adapted in operation of the device to project into the internal volume of the container, the light guide body being of rectangular cross-section and having an end face with an entry region for the entry of light into the light guide body and an exit region for the exit of light from the light guide body and first and second side faces each comprising steps providing at least two reflection faces, the reflection faces at the one side face being associated with respective reflection faces at the other side face, wherein the reflection faces of the first side face are at least in part such that light entering the light guide body at said entry region is refracted into the liquid when the reflection face in question is immersed in the liquid but is totally reflected back into the light body in a direction towards the second side face thereof when the reflection face in question is not immersed in the liquid and the light totally reflected by a reflection face at said first side face is reflected by the respectively associated reflection face at the second side face in a direction towards the exit region of said end face, measuring means for providing at least one measurement signal of the intensity of a light beam totally reflected by each said reflection face of said second side face wherein said measurement signal is separately detected as a separate measurement of the intensity of the light reflected by each step relative to other steps, and an evaluation means for implementing a plausibility check in respect of signals from said measuring means for recognizing and eliminating measurement errors.

12. Device as set forth in claim 11 wherein the reflection faces of the first side face are permanently reflective.

13. Device as set forth in claim 11 wherein the reflection faces of the second side face are permanently reflective.

14. Device as set forth in claim 11 wherein the reflection faces of the first side face are at least in part of a permanently reflective nature in a portion thereof.

15. Device as set forth in claim 11 wherein the reflection faces of the second side face are at least in part of a permanently reflective nature in a portion thereof.

16. Device as set forth in claim 11 wherein the measuring means are disposed on the light exit region of said end face.

17. Device as set forth in claim 11 wherein the measuring means are disposed in the light exit region of said end face.

18. Device as set forth in claim 11 wherein said reflection faces form an angle of substantially 45° with the direction of incident light.

19. Device as set forth in claim 11 wherein said measuring means includes at least one photosensor for each reflection face.

20. Device as set forth in claim 19 wherein said measuring means comprises a line sensor.

21. Device as set forth in claim 11 including a light source for providing light for said light guide body, wherein said measuring means comprises a photosensor measuring means; and wherein a limit band of the light source, a light guide spectrum of said light guide body and a sensitivity spectrum of said photosensor measuring means are matched to each other.

22. The device according to claim 11, wherein said plausibility check implemented by said evaluation means comprises evaluating the measurement signal from a reflection face and identifying whether or not said reflection face is signaling full under conditions where a lower reflection face is signaling empty.

23. Device for determining a filling level in a liquid-filled container, including a light guide body which is adapted in operation of the device to project into the internal volume of the container, having an end face with an entry region for the entry of light into the light guide body and an exit region for the exit of light from the light guide body and a side face comprising steps providing at least two at least substantially annular reflection faces, wherein said reflection faces are so designed at least over a portion of a periphery of said reflection faces that light entering the light guide body at the entry region is refracted into the liquid at a respective reflection face when the reflection face in question is immersed in the liquid but is totally reflected back into the light guide body in a direction on to the oppositely disposed region of the reflection faces and from there further to said end face when the said reflection face is not immersed in the liquid, measuring means for providing at least one measurement signal of the intensity of each respective light beam totally reflected by each step to said end face wherein said measurement signal is separately detected as a separate measurement of the intensity of the light reflected by each step relative to other steps, and an evaluation means for implementing a plausibility check in respect of signals from said measuring means for recognizing and eliminating measurement errors.

24. Device as set forth in claim 23 wherein at least some of the reflection faces are of a permanently reflective nature over a part of the periphery of said reflection faces.

25. Device as set forth in claim 23 wherein said light guide body is of a circular cross-section.

26. Device as set forth in claim 23 wherein the measuring means are disposed on the light exit region of said end face.

27. Device as set forth in claim 23 wherein the measuring means are disposed in the light exit region of said end face.

28. Device as set forth in claim 23 wherein said reflection faces form an angle of substantially 45° with the direction of incident light.

29. Device as set forth in claim 23 wherein said measuring means includes at least one photosensor for each step.

30. Device as set forth in claim 23 wherein said measuring means comprises a line sensor.

31. Device as set faith in claim 23 including a light source for providing light for said light guide body, wherein a limit band of the light source, a light guide spectrum of said light guide body and a sensitivity spectrum of a photosensor measuring means are matched to each other.

32. The device according to claim 23, wherein said plausibility check implemented by said evaluation means comprises evaluating the measurement signal from a reflection face and identifying whether or not said reflection face is signaling full under conditions where a lower reflection face is signaling empty.

33. Device for determining a filling level in a liquid-filled container, including an elongate light guide body having a side surface and an end face with an entry region for the entry of light into the light guide body and an exit region for the exit of light from the light guide body, the light guide body further comprising steps at said side surface defining at least two reflection faces at a spacing in the direction of elongation of the light guide body, means for mounting the light guide body to a said container in a position such that the light guide body projects into an internal volume of the container, an arrangement of said light guide body and said means for mounting being such that in operation light entering the light guide body at said entry region is refracted into the liquid at a said reflection face immersed in the liquid but at a said reflection face clear of the liquid said light is totally reflected back into the light guide body on to the side surface at a location in opposite relationship to the location of its reflection and is totally reflected therefrom in a direction towards the exit region of said end face, measuring means for providing at least one measurement signal of the intensity of the light beam totally reflected at a step which is clear of the liquid wherein said measurement signal is separately detected as a separate measurement of the intensity of the light reflected by each step relative to other steps, and an evaluation means for implementing a plausibility check in respect of signals from said measuring means for recognizing and eliminating measurement errors.

34. The device according to claim 33, wherein said plausibility check implemented by said evaluation means comprises evaluating the measurement signal from a reflection face and identifying whether or not said reflection face is signaling full under conditions where a lower reflection face is signaling empty.

* * * * *

UNITED STATES PATENT AND TRADEMARK OFFICE
CERTIFICATE OF CORRECTION

PATENT NO. : 6,921,911 B2
DATED : July 26, 2005
INVENTOR(S) : Siepmann

It is certified that error appears in the above-identified patent and that said Letters Patent is hereby corrected as shown below:

Column 10,
Line 20, after "the" insert -- at least one --.
Line 20, after "measurement" delete "signals" and insert -- signal --.

Signed and Sealed this

Twenty-eighth Day of March, 2006

JON W. DUDAS
*Director of the United States Patent and Trademark Office*